(12) United States Patent
Zumpano

(10) Patent No.: US 6,209,908 B1
(45) Date of Patent: Apr. 3, 2001

(54) INFLATABLE RESTRAINT ASSEMBLY FOR VEHICLES

(75) Inventor: Bernard J. Zumpano, Miami, FL (US)

(73) Assignee: Z/C Holding Company, Miami, FL (US)

( * ) Notice: Subject to any disclaimer, the term of this patent is extended or adjusted under 35 U.S.C. 154(b) by 0 days.

(21) Appl. No.: 09/470,922

(22) Filed: Dec. 23, 1999

(51) Int. Cl.$^7$ .......................... B60R 21/22; B60R 21/24; B60R 21/26

(52) U.S. Cl. ...................... 280/729; 280/730.1; 280/735; 280/736

(58) Field of Search ................. 280/729, 730.1, 280/735, 736, 742, 737

(56) References Cited

U.S. PATENT DOCUMENTS

| | | | |
|---|---|---|---|
| 3,802,719 | * 4/1974 | Brown | 280/729 |
| 5,707,078 | * 1/1998 | Swanberg et al. | 280/735 |
| 5,842,718 | * 12/1998 | Byon | 280/735 |
| 5,927,753 | * 7/1999 | Faigle et al. | 280/735 |
| 5,947,514 | * 9/1999 | Keller et al. | 280/735 |
| 6,068,288 | * 5/2000 | Karolek et al. | 280/735 |

* cited by examiner

Primary Examiner—Peter C. English
(74) Attorney, Agent, or Firm—Malloy & Malloy, P.A.

(57) ABSTRACT

An inflatable restraint system intended for use primarily, but not exclusively, within motor vehicles to protect occupants from injury resulting from a collision, crash or other impact type of accident in which the vehicle is involved. A plurality of inflatable members are mounted at a plurality of strategic locations relative to the various positions assumed by occupants within the vehicle, such that upon the vehicle being impacted, a central processing unit or like processor structured to sense the impact will automatically inflate the inflatable members so that they assume a protective position which will interact with the occupant in a manner which, unlike conventional airbags, both actively absorbs and resists the force of the impact resulting from the occupant coming into contact, at an accelerated rate, with the inflatable member(s). The processor is operatively connected to a valve assembly disposed in regulating relation to air flow both into and out of the inflatable member, and is further responsive to a pressure sensor assembly, so as to actively regulate pressure within the inflatable member and thereby minimize repetitive acceleration-deceleration motion of the occupant by both absorbing and resisting the force of impact of the occupant on the inflatable member.

30 Claims, 6 Drawing Sheets

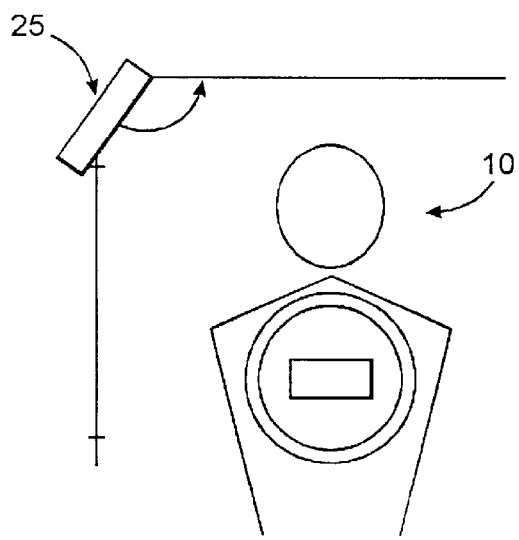 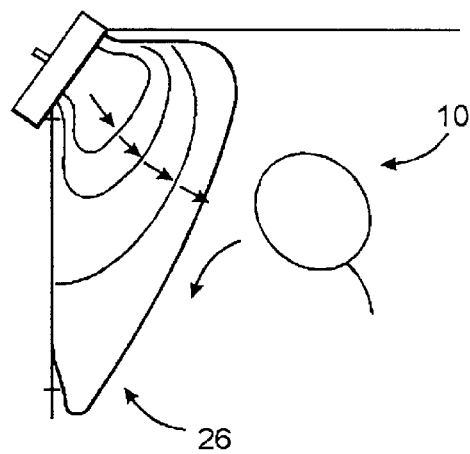
FIG. 6    FIG. 7
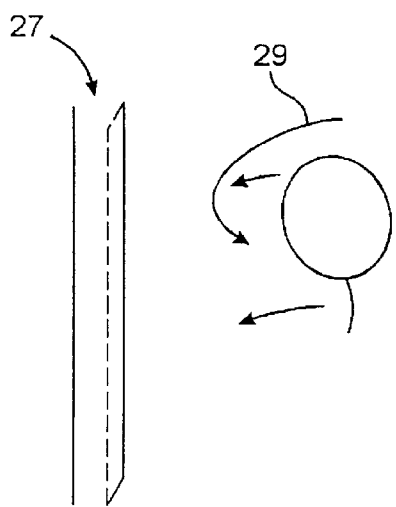 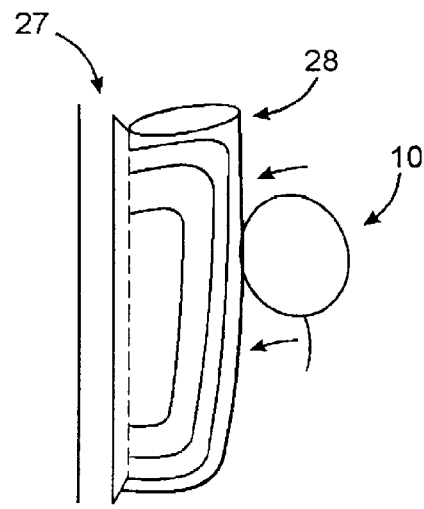
FIG. 8    FIG. 9

INFLATABLE RESTRAINT ASSEMBLY FOR VEHICLES

BACKGROUND OF THE INVENTION

1. Field of the Invention

This invention relates to an inflatable restraint system primarily designed for use within a motor vehicle to protect occupants when the vehicle is involved in an accident, and specifically, a collision or other type of crash or impact. The inflatable restraint system comprises a central processing unit or other processor operatively connected to both a sensor assembly and a valve assembly in order to initially inflate and actively regulate pressure within a first and second plurality of chambers, respectively defining impact absorption and impact resistance zones, disposed on the interior of each of one or more inflatable members mounted at strategic locations adjacent intended occupant positions within the vehicle.

2. Description of the Related Art

Every year, thousands of people in the United States alone are involved in motor vehicle accidents, many of which result in the death of one or more occupants and/or severe bodily injury to others. Aside from the devastation and havoc these accidents cause in people's lives, they also result in costs of over five billion dollars annually to the insurance industry, health care industry, health care providers, the federal government, public health agencies and many others. It should, therefore, be clear that the cost of morbidity (long term injury consequences) to the automobile and insurance industries is staggering.

Attempts to protect the occupants in a motor vehicle include seat belts, also known as restraint harnesses and more recently, inflatable air bags. Such devices are most certainly a step in the right direction, and when used properly, have saved a tremendous number of human lives. Even so, both seat belts and air bags suffer from distinct disadvantages. By way of example, harness restraints including lap belts, chest belts, etc., limit the forward or lateral motion of the body's acceleration caused by an impact, but in doing so, such restraints cause the base of the neck to act as a fulcrum or axis of rotation-flexion-extension to further accentuate the force of acceleration of the head on the neck. More specifically, when there is a collision, the motor vehicle is usually stopped by the impact, but the forces applied to the body and restrained by the seat and/or lap belts are nevertheless also acting to set the head in motion upon the neck, leading to impact injuries caused by a collision of the head against the front or side window, ceiling of the car or steering wheel. Thus, the common mechanism of injury to the brain, spine and/or spinal cord in head-on collisions is an acceleration of the head, and the neck, causing a hyperflexion-hyperextension injury, whereas in broad-side collisions, the head is accelerated to the side or laterally causing a lateral-flexion injury.

Most modern day motor vehicles use a combination of restraint harnesses and inflatable air bags, which typically, inflate during a collision in an extremely rapid manner from the steering wheel and/or front console area of the vehicle and towards the occupants. Thus, inflatable air bags are intended to cushion the occupant as he or she is thrust forward, under the forces being applied during a head on collision, and impacts the air bag. While the provision of air bags on modern day motor vehicles has certainly brought down the mortality rate, meaning that more people can survive the violent forces of a head on collision, the injury rate is thought to have increased, meaning that survivors of these and other types of crashes often suffer from serious head, neck and/or spinal cord injuries. That is because by the time the air bags are deployed, the forces caused by the vehicular impact are already acting on the body and, as set forth above, cause acceleration of the head on the neck as well as of the torso on the hip. In some instances, air bags have even been reported to cause nasal and facial fractures and, in extreme circumstances, result in the forcing of bone fragments into the brain. Further, the direction of air bag discharge is almost invariably towards the occupant and can promote hyperextension injury to the spine or posterior head injury. This is prevalent and can be particularly dangerous in elderly persons with osteoporosis, a thinning of the bones with age due to calcium depletion.

There have been some attempts to improve the protection for motor vehicle passengers, which have primarily been directed to the deployment of air bags from multiple locations within the vehicle, in order to surround an occupant with restraints. Such attempts have found favor and are promoted primarily by some European car manufactures, most notably those which proclaim the benefits of "side air bags." While adding to the expense of the automobile, these and other multi-location deployment systems have been offered in response to an increased demand to solve the problem of multiple trauma injuries, prevalent in impact accidents. Further, such attempts reflect the desire of the motor vehicle industry to control and find a solution to problems that continue to cause death, disability and injury at an ever increasing rate. Such attempts are also a positive step forward in the effort to reduce death and serious bodily injury during accidents due to direct impact to the vehicle. However, even air bags that deploy from the side or other location in a motor vehicle do not effectively address the forces at work during an impact that cause acceleration of the head relative to the neck, and/or of the neck relative to the torso, and therefore, the problem of brain, spine, neck and torso injuries resulting from such accidents have also not been adequately addressed.

Accordingly, there remains a need in this art for an inflatable restraint assembly which is designed and structured to more actively intercept at least the head and neck motion of an occupant riding in a motor vehicle undergoing a collision or other impact. More specifically, there is a need for an inflatable restraint assembly which attempts to reverse the forces of impact between a passenger and an air bag, sufficiently to diffuse such forces by applying an equal and opposite force, while buffering the passenger's impact, and thereby, reducing dynamically and actively, the range of motion of the head, neck and torso, caused by the impact. Any such improved restraint assembly developed would preferably also utilize at least two, oppositely disposed and pressure sensing inflatable members, each having a plurality of chambers, and further, through the application of microcomputer-microprocessor technology, initiate a positive gradient increase in pressures to some, but not all chambers of each pressure sensing inflatable member, for the specific purpose of slowing the acceleration forces at work on an occupant's body, while applying an equal and opposite force to the force of impact of the occupant's body with the other(s) of the inflatable members. Any such improved restraint system should further include a plurality of inflatable restraint devices or bags strategically located at various points throughout the passenger compartment, including but not necessarily limited to the ceiling, door post and seat belts, so as to provide as much surrounding or "global" protection as possible, with the goal being to significantly reduce injury by a reduction of the forces exerted on the occupant's body during impact type accidents. In addition, any such improved restraint assembly developed should also overcome the long existing problems of known restraint systems through the ability to actively oppose impact forces "intelligently" through a series of dynamic pressure measurements conducted in response to the acceleration-deceleration of the various portions of the passenger's body as the body impacts substantially oppositely disposed, but cooperatively positioned, inflatable members.

In addition to the above, any such improved restraint assembly developed should have the capability of storing data for determining and recalling related information, such as predicted speed of impact and a record of pressure sensing data. Such data could be correlated with post injury medical findings to determine, over a period of time, what impact and pressure ranges cause disabling injury as versus those impact and pressure forces which are only suspect at the present time. Such memory capabilities would serve as a meaningful tool of analysis and benefit to the medical and insurance industries, among others.

SUMMARY OF THE INVENTION

The present invention is intended to address these and other needs which remain in the art and is directed towards an inflatable restraint assembly that is primarily, but not exclusively, designed for use within a motor vehicle. The restraint assembly comprises a plurality of inflatable members, which are strategically mounted throughout the interior passenger compartment of the vehicle at locations adjacent to an intended occupant position, such that deployment of one or more of the inflatable members will provide maximum protection to an occupant, when located in one of the intended positions normally occupied. Further, it is emphasized that while a detailed explanation of the structural and operative features of the present invention will be described relative to at least one inflatable member, one feature of the present invention is the cooperative positioning of two or more of such inflatable members, so as to be "globally" oriented or collectively disposed in at least partially surrounding, alternatively intercepting relation to each of the occupants. Such cooperative and collective positioning of a plurality of the inflatable members of the present invention are, in certain instances, specifically intended to significantly reduce injury to the occupant caused by an excessive acceleration or forward motion followed immediately by a rebounding deceleration, which often occurs through the use of conventionally known air bags or inflatable restraint devices. In such known systems, the conventional air bag structure is forcibly inflated resulting in a deployment of the bag in a direction substantially towards the occupant. As a result, the occupant frequently suffers damage upon impact with the conventional air bag and quite frequently suffers hyperextension and/or hyperflexion type injuries, due to a forceful forward and backward acceleration of the head on the neck and/or the body torso upon the lower back and hip.

In order to avoid these types of well recognized problems associated with the use of conventional inflatable restraint systems and structures, the present invention utilizes a central processing unit or other type of processor, which is electrically connected or otherwise operatively associated with a valve assembly and a pressure sensor assembly, so as to initially deploy, through inflation, the one or more inflatable members into their operative position. The processor, valve assembly and sensor assembly are operatively interactive to diffuse the force of impact caused by the occupant contacting cooperatively positioned ones of the plurality of inflatable members. More specifically, each of the inflatable members of the present invention actively opposes the force of impact between the occupant and the inflatable member and does so "intelligently" through a series of dynamic pressure measurements, made each time the head, neck or torso of the occupant rocks in a "to-and-fro" motion, impacting at least one, but under certain conditions, at least two substantially opposing and alternately intercepting inflatable members.

The sensor assembly is structured to detect the pressure inside a plurality of internally disposed chambers within each of the inflatable members, and to relay the data relating to the internal pressure within the various chambers of each of the inflatable members to the processor. The processor activates a source inflatable material or fluid, such as air, and initiates operation of the aforementioned valve assembly to provide an initial inflation pressure in predetermined ones of the plurality of chambers of the one or more inflatable members. The pressure within each of the inflatable members is then actively regulated or adjusted to accommodate the force of impact of the occupant with the inflatable member in a manner which causes both a resistance to and at least a partial absorption of the force of impact. The active and "intelligent" regulation of the pressure within the inflatable members serves to reduce any type of repetitive to-and-fro motion, as set forth above. When two substantially opposing inflatable members are working in concert, each has the internal pressure thereof actively regulated or adjusted on an alternating, repetitive basis in order to reduce the to-and-fro motion or acceleration-deceleration of the occupant, to a series of lesser motions or oscillations of the head and torso.

Upon the vehicle being impacted, at least one of a plurality of impact sensors, located on the vehicle and connected to the aforementioned processor, communicates in micro-seconds the occurrence of an impact of sufficient predetermined force to possibly cause injury to the occupant within the passenger compartment. Upon such indication, the processor activates also within micro-seconds a source of fluid or other inflatable material and/or the valve assembly to cause an initial inflation and resulting deployment of at least some of a plurality of inflatable members.

At least one, but preferably all, of the inflatable members comprise a number of internally disposed chambers, wherein adjacent ones of such chambers are separated from one another by a partition. While the actual number of chambers within each inflatable member may vary, the chambers are collectively disposed and cooperatively structured to define an impact absorbing zone and an impact resistance zone within each of the inflatable members. For purposes of clarification, the impact absorption zone may be defined by at least one, but most probably, a first plurality of internally disposed chambers defining a "leading" portion of the inflatable member. The term "leading" portion is meant to describe that portion of the inflatable member which first contacts the head or other portion of the occupant's body. The impact resistance zone is located "rearwardly" of the impact absorption zone and is defined by at least one but preferably a second plurality of chambers.

While the inflatable restraint assembly of the present invention contemplates the use of at least one inflatable member having the aforementioned impact absorption zone and impact resistance zone, maximum protection to the one or more occupants may best be provided through the use of at least two of the aforementioned inflatable members, disposed in substantially opposing relation to one another.

When such two inflatable members are cooperatively positioned they each act as "interceptors" for the purpose of reducing the normal, relatively excessive to-and-fro motion to lesser oscillations by allowing the force of impact of the occupant onto a first of the inflatable members to be at least partially absorbed, but at the same time, resistant by actively regulating the pressure within the first inflatable member. At the same time, the pressure within the inflatable member needed to respond to the degree of the force of impact of the occupant thereon is determined. This information is then relayed, through cooperative workings of the sensing assembly with the processor, to communicate the expected and/or summated force of impact of the occupant onto the second or intercepting one of the cooperatively positioned two inflatable members. The relayed information then allows the pressure within the second of the inflatable members to be further regulated or varied to again absorb the force of impact onto the second inflatable member. As will be explained in greater detail hereinafter, the processor and sensor assembly are cooperatively structured and operationally functional so as to arrive at a summation of the pressure within each of the inflatable members and vary the total pressure so as to accomplish absorption of the force of impact of the occupant by means of at least partial deflation of the impact absorption zone while maintaining a sufficient resistance force in the impact resistance zone of each inflatable member. The summation of the pressure within any of the inflatable members, should not exceed the force of impact of the occupant onto the inflatable member, so as to not result in a forcible rebounding of the occupant, which would add to the acceleration/deceleration or to-and-fro motion of the occupant.

The inflatable restraint assembly of the present invention also comprises one or cooperative pairs, or more, of the inflatable members being located strategically throughout the various portions of the passenger compartment, wherein such strategic locations include but are not limited to the ceiling, side or door post of the vehicle, shoulder or body hardness, etc. In addition, the one or more inflatable members could be mounted directly on an auxiliary seat, such as a child seat, so as to be structured to operate in substantially the same manner. In each of the aforementioned embodiments, one feature of the present invention is that in most cases, the initial inflation and deployment of each of the inflatable members does not occur in a direction that is directly towards the occupant. Such directional deployment of known conventional air bags has, as set forth above, in some cases resulted in severe injury to the occupant.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6 is a schematic representation of one preferred location of an inflatable member in accordance with the present invention.

FIG. 7 is a schematic representation of the embodiment of FIG. 6 with the inflatable member in a deployed position.

FIG. 8 is a schematic representation of another preferred location of at least one inflatable member of the present invention.

FIG. 9 is a schematic representation of the embodiment of FIG. 8 with the inflatable member being deployed.

Like reference numerals refer to like parts throughout the several views of the drawings.

DETAILED DESCRIPTION OF THE PREFERRED EMBODIMENT

As shown in the accompanying drawings, the present invention relates to an inflatable restraint assembly designed primarily, but not exclusively, to protect occupants, generally indicated as 10, within a motor vehicle, generally indicated at 12.

Figure 1:
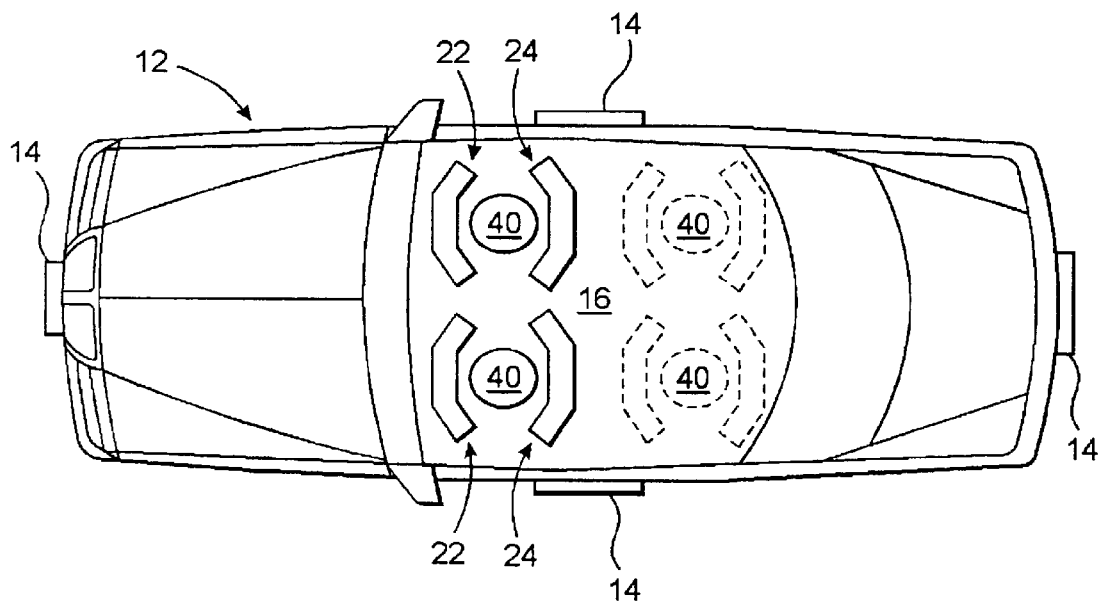
FIG. 1 is a top view of a vehicle showing interior portions and the general locations of a plurality of cooperatively disposed inflatable members relative to an intended position of an occupant within the vehicle.
Figure 3:
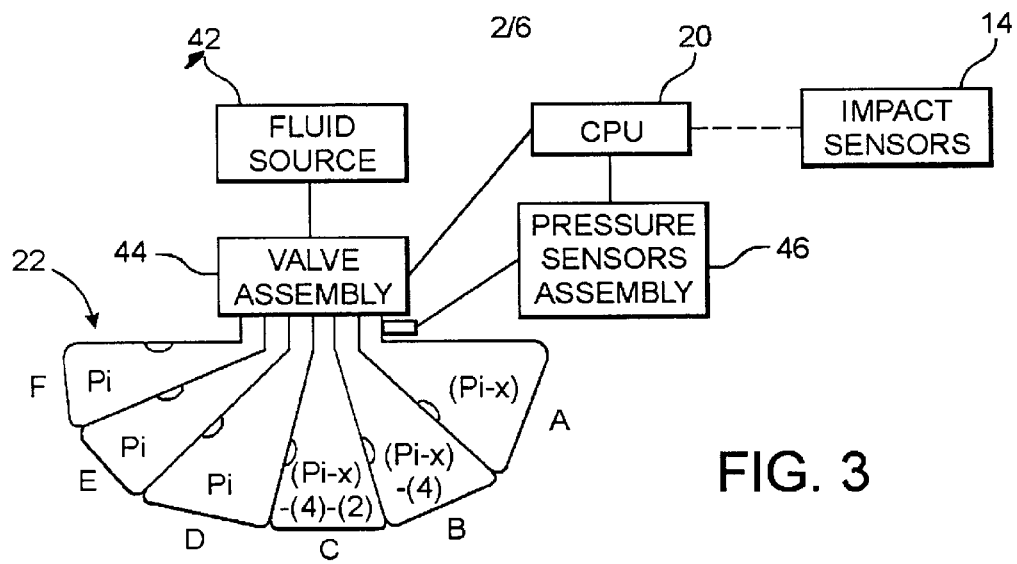
FIG. 3 is a schematic representation of a representative one of the inflatable members along with the operative components of the assembly causing its inflation and pressure regulation.

More specifically, and as shown in FIG. 1, the vehicle 12 is equipped with a plurality of impact sensors, as at 14, located at various positions on the vehicle, so as to sense the occurrence of an impact of sufficient degree to possibly cause harm to occupants within the passenger compartment 16 of the vehicle 12. The location of the impact sensors 14 in FIG. 1 is meant to be representative only of a plurality of locations where such impact sensors 14 could be positioned, the knowledge of which is possessed by persons of skill in the art relating to air bag deployment. In addition, and as shown in FIG. 3, the impact sensors 14 are operably connected and/or coupled to a computer processor, such as a micro-processing chip or other central processing unit (CPU) 20, incorporated within the vehicle 12 and responsive to the impact sensors 14 to the extent of activating one or more of the inflatable members, such as 22, 24, etc., incorporated within the restraint assembly of the present invention. As shown in FIG. 1, an inventive feature of the present invention is the strategic location of the plurality of inflatable members in an operative position, relative to the plurality of intended positions 40 of the occupants. The intended occupant positions 40 are representative only since such positions may vary depending upon the size and configuration of the vehicle.

Figure 2:
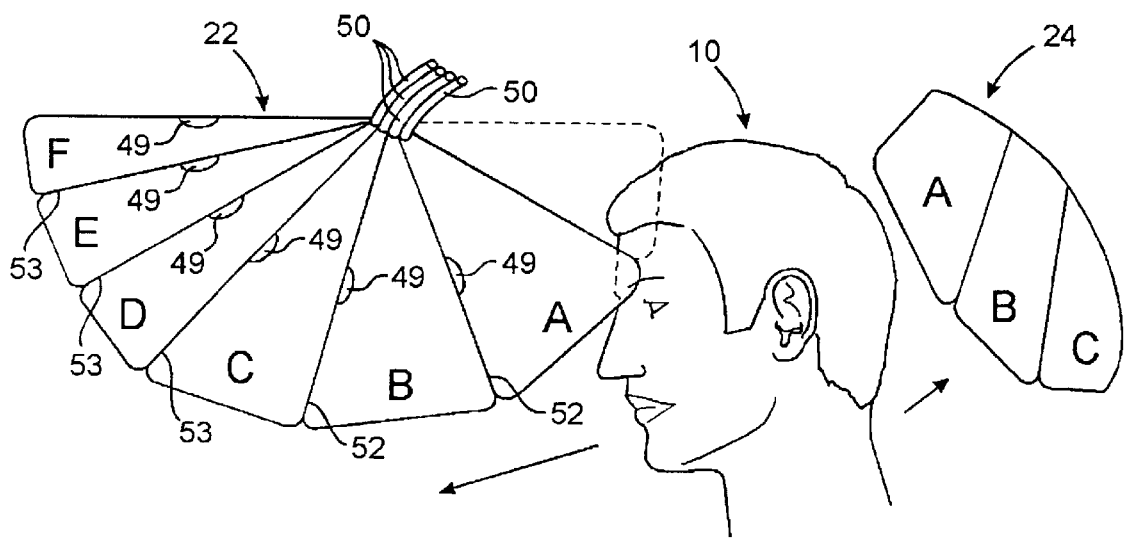
FIG. 2 is a schematic representation of an occupant relative to two cooperatively disposed inflatable members.

With regard to FIGS. 1 and 2, one embodiment of the present invention includes inflatable members 22 and 24 located in substantially opposing relation to one another and in a position relative to an occupant 10 to receive the repetitive and alternating "to-and-fro" motion resulting from the occupant's head (or other portions of the occupant's body) contacting a first inflatable member 22 and then, in a rebounding motion, contacting an intercepting, second inflatable member 24. For example, when a vehicle is involved in a head-on collision, the occupant's head 10 would initially be thrust forward and into a first, forwardly disposed inflatable member, such as 22 in FIGS. 2, 4 and 5, and would then rebound into a second, rearwardly disposed inflatable member, such as 24 in FIG. 2. Of course, if the impact were coming from the opposite direction, the occupant's head 10 could initially be thrust into contact with the rearwardly disposed inflatable member 24 and then into the forwardly disposed inflatable member 22, and thus, the terms "first" and "second" or "forward" and "rearward" should not be construed in a limiting sense.

To assume the cooperative, substantially opposing relation of the first and second inflatable members 22 and 24 respectively, such inflatable members would preferably be mounted in the ceiling in a collapsed, stored position maintainable by pivotally attached cover members, which are forced open upon a pressurized inflation of the inflatable members 22 and 24. As will be explained in greater detail, particularly with reference to FIGS. 6 through 15, the inflatable members may be used independently of one another or in cooperative relation with one another and may be mounted at a variety of other strategic locations within the passenger compartment 16 in order to protect the occupant 10 from an impact occurring on or to the vehicle 12 from the front, rear, side, top, etc.

With primary reference to FIGS. 2 through 5, the structural and operational features of a single inflatable member 22 will now be described. It is pointed out, however, that each of the inflatable members, whether working independently of one another or in cooperative relation to one another, as explained with referenced to FIG. 2, have a substantially equivalent structure and operation. Accordingly, the inflatable restraint assembly of the present invention comprises a fluid source 42 which may include one or a plurality of sources of air, gas, gel, or other inflatable fluid material, wherein each of the plurality of inflatable members, such as 22 and 24, or such as 26 and 28 shown in FIGS. 7 and 9, may be connected in fluid communication with a separate fluid source or different, independent fluid sources. In addition, a valve assembly 44 is operatively connected with each of the inflatable members 22 so as to regulate flow to and from the interior thereof, in a manner to be described in greater detail hereinafter. Also, a pressure sensing means, preferably comprising a pressure sensor assembly 46, is associated with each of the inflatable members 22, 24, 26, 28, etc. in a manner which serves to sense the pressure in various portions or zones on the interior thereof and relay such sensed pressure to the processor or CPU 20. The CPU 20 controls and activates the valve assembly 44 to actively regulate and/or vary the pressure between the various portions or zones of each of the inflatable members, as will be explained.

Each of the inflatable members is defined by a multi-chamber construction wherein, in the specific embodiment shown in FIGS. 2 through 5, a first plurality of internally disposed chambers A, B, and C define an "impact absorption zone" which is located generally on what may be termed a leading portion of the inflatable member 22. A second plurality of chambers D, E, and F may define what is referred to as an "impact resistance zone" and are located on a trailing portion of the inflatable member 22, relative to the direction of travel or motion of the occupant 10 when engaging the inflatable member 22, during an accident. It is emphasized that the number of chambers in the impact absorption zone as well as the impact resistance zone may vary, and further, that the number of chambers in each zone may differ from one another. The sensor assembly 46 is specifically structured to sense the pressure within each of the aforementioned chambers A, B, C, D, E, and F and may comprise a plurality of individual sensors 49 connected by appropriate wiring 50 to a printed circuit board or like controller mechanism (not shown) incorporated within the sensor assembly 46, which in turn, is connected to the processor or CPU 20. It is to be emphasized that a variety of other individual sensor structures, other than sensors 49 may be incorporated and operative to perform the primary function of sensing the pressure within each of the individual chambers A, B, C, D, E, and F in relaying such sensed or determined pressure back to the controller incorporated within the main body of the sensor assembly 46.

Each of the adjacent chambers are at least partially segregated from one another by an appropriately positioned partition 52 or 53. More specifically, each of the partitions 52 serves to at least partially segregate the internal chambers A, B, and C of the impact absorption zone and include an apertured construction in order to allow at least some fluid flow therethrough. This embodiment serves to facilitate a partial collapse or deflation of the impact absorption zone by allowing the fluid to be forced from chamber A to chamber B and eventually to chamber C, where it then may flow out, from the chambers of the impact absorption zone through the valve assembly 44. Conversely, the partitions 53 serving to separate the various internal chambers of the impact resistant zone from one another, as well as the chamber C from the chamber D, do not have any type of apertured construction and are, therefore, structured to define total segregation and to not permit air flow to pass between the chambers D, E and F, of the impact resistance zone, for reasons which will be made clear upon further description set forth hereinafter. The valve assembly 44 serves to regulate fluid flow into and out of each of the internal chambers A, B, C, D, E, and F and may take a variety of configurations, which are structurally and operationally capable of independent flow into and out of the individual chambers A, B, C, D, E, and F, as well as the selective maintenance of the pressure within certain ones of the chambers and deflation of certain others of the plurality of chambers.

The workings of the one or more inflatable members 22, 24, etc., independently or in combination with one another, and the gradient pressure differential between the various internal chambers A, B, C, D, E, and F in particular, will now be explained. The term "gradient pressure differential" is meant to include the difference in pressures between each of the chambers of the inflatable members specifically wherein some of the internal pressures of various ones of the chambers are greater than in others. Accordingly, for purposes of explanation, the initial inflation pressure will be represented as Pi and will also be equal to the pressure within the second plurality of chambers D, E, and F, defining the impact resistance zone of each inflatable member 22. The pressure in chamber A, being the first or leading internal chamber of the impact absorption zone, is maintained lower than the initial inflation pressure Pi, by an increment of pressure represented as (x). Therefore, the total pressure in chamber A before the force of impact of the occupant with that inflatable member may be expressed as (Pi−x).

The pressure in chamber B will be lower than the pressure in chamber A and accordingly lower than the pressure Pi maintained in chambers D, E, and F. In relationship to chamber A, the pressure in chamber B may be assigned value (y) and may be expressed as (Pi−x)−(y).

The pressure in chamber C will be lower than that in chamber B by a value (z). Therefore, the pressure in chamber C may be expressed as (Pi−x)−(y)−(z).

Accordingly, it should be seen that the collective pressure in chambers A, B, C, is lower than the pressure Pi maintained in chambers D, E, and F.

In operation, the force of impact of an occupant 10 on an inflatable member 22 causes a transfer of pressure from chambers A to B to C, and if pressure within these chambers is excessive, beyond a certain threshold point which may threaten the integrity of the structure of the inflatable member 22, an outflow of air through the valve assembly 44 occurs. The sensor assembly 46 summates the transmission of pressure forces, expressed as a change of pressure, while chambers D, E, and F provide initial resistance to the force of impact of the occupant 10. The processor 20 then "reads" the force of impact of the occupant that needs to be opposed and rapidly deploys a discharge of air from the fluid source 42 to the chambers D, E, and F. As set forth above, chambers D, E, and F do not communicate with one another so that disruption of the integrity of one chamber, due to shear forces or tearing, will not compromise the function of the entire inflatable member 22. This rapid deployment of air into chambers D, E, and F, occurs in increments and creates an equal and opposite force to the force of impact, but not a greater force than the force of impact, so as to provide an active opposition to and correction of the force of impact of the occupant. This correction serves to slow the acceleration of the occupant, as well as the occupants range of motion. This, in turn, reduces the momentum upon the body part of the occupant 10 contacting the inflatable member 22, and further reduces successive to-and-fro motions to lesser oscillations of motion of the occupant.

By way of further explanation, the summated pressure within the inflatable member 22, upon the occurrence of a first force of impact of the occupant is expressed as P1. In terms of the pressures within the various chambers, the summated pressure Pi is more specifically postulated to be P1=(Pi)+(Pi−x)+((Pi−x)−(y))+((Pi−x)−(y)−(z))+E, where E represents the external force of acceleration of the occupant. The processor 20 arrives at P1, reads the difference between P1 and the pressure Pi, and incrementally adds the amount of the air needed to in-fill chambers D, E, and F, to meet and oppose this summated pressure, P1. This rapid inflation, followed by rapid deflation of the chambers D, E and F back to the pressure Pi, restores the unit to base line to receive the next impact. That summated pressure information is then transmitted by the processor 20 to the opposing, cooperatively positioned inflatable member 24 (see FIG. 2), to provide an opposing force at least equal but not less than the previous opposing force and reduced by an increment to be determined, so that the summated pressure is not greater than the force impact of the occupant. As a result, a lower total summation pressure, P2 of the inflatable member 24 is provided as compared to P1 of the inflatable member 22. Repeated impacts will register successive summation pressures of alternating, interceptor inflatable members 22 and 24 as P3, P4, P5, etc. wherein each successive total summation pressure and opposition-corrective pressure will be successively lower than the preceding pressure, because of reduced inertia, active opposing pressure forces by the inflatable members 22, 24, and the coefficient of air friction, all coming into play.

Figure 4:
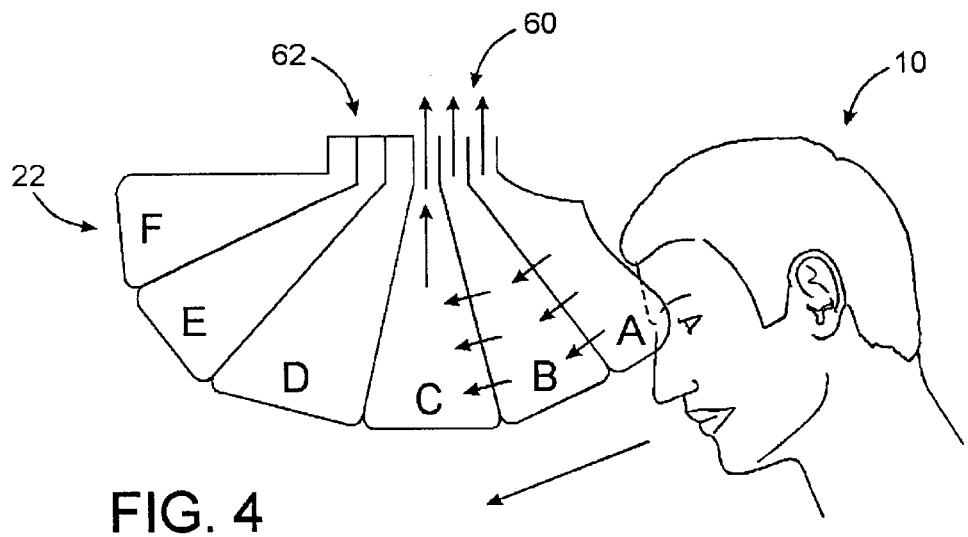
FIG. 4 is a schematic representation of the inflatable member of FIG. 3 and a forwardly directed impact caused by accelerated forces acting on the head and neck of an occupant.
Figure 5:
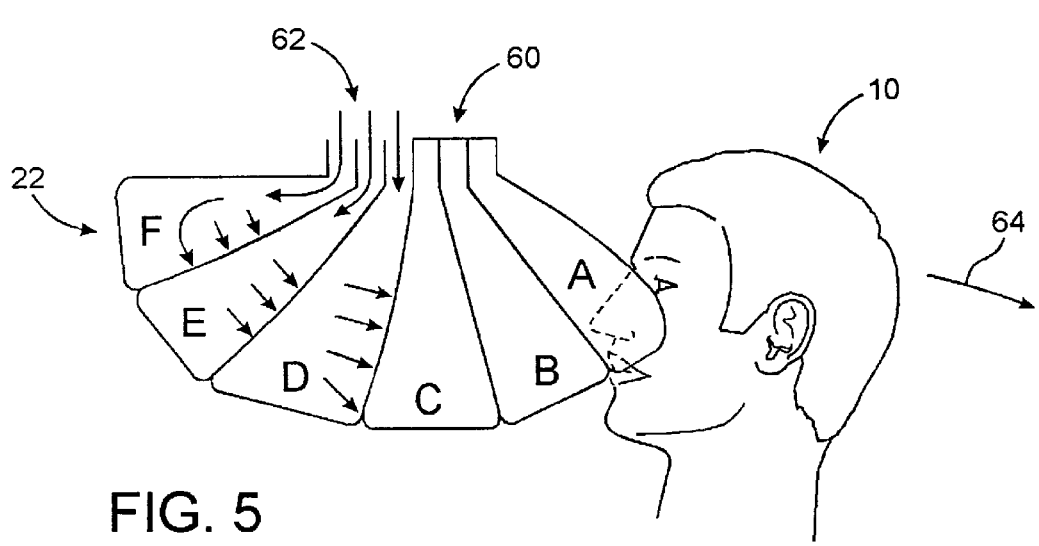
FIG. 5 is a schematic representation of the inflatable member of FIGS. 3 and 4 in another sequence corresponding to a rebounding movement of the occupant's head and neck in an opposite, rearward direction.

With reference to FIGS. 3, 4 and 5, the occupant 10 engages the inflatable member 22 at a first chamber A, which is the leading portion of the impact absorbing zone. The pressure in chambers A, B, and C begins to reduce through a transfer of air from chamber A to chamber B and from chamber B to chamber C and eventually, through the valves 60, which are now open. At this point the valves 62 associated with the chambers D, E, and F of the resistance zone are maintained in a closed position, due to activation and control by the processor 20. It should be apparent, therefore, that in reaction to the force of impact of the occupant 10 with inflatable member 22, the impact absorption zone will serve to absorb a portion of the force of impact while the pressure within chambers D, E, and F will be initially maintained the same pressure, Pi. Therefore, chambers D, E, and F will present a resistance force, and thereby, serve to define the impact resistance zone of the inflatable member 22. However, as shown in FIG. 5 the processor 20 "reads", through operation of the sensor assembly 46, the force of impact of the occupant 10 on the inflatable member 22, and thereby, determines the amount of pressure required to oppose this force of impact and incrementally increases the pressures within the chambers D, E, and F of the impact resistance zone in order to make the summation of forces Pi, within the inflatable member equal to, but not greater than, the force of impact of the occupant 10 engaging the inflatable member 22. In order to accomplish this, the valves 60 into chambers A, B, and C are closed, whereas the valves 62 are opened to allow for the immediate and rapid inflow of air for purposes of the aforementioned incremental increase in pressure. This rapid deployment of air discharged into chambers D, E, and F occurs in an increment to create an equal and opposite force, but not a greater force than that of the force of impact of the occupant 10 engaging the inflatable member 22. A creation of a greater force is prohibited in that such an excessive force created in chambers D, E, and F would "re-accelerate" the head or other body part, possibly causing further damage or injury to the occupant 10 by rebounding in the opposite direction as indicated at 64.

When the two or more inflatable members 22 and 24 are working in cooperative relation to one another, in that they are substantially opposed as shown in FIG. 2, the motion indicated as 64 will be a rebounding motion. The occupant will be intercepted by the second inflatable member 24, which will react in the same manner in terms of actively regulating or varying the pressure in the various chambers A, B, and C of the impact absorption zone, as well as the internal chambers D, E, and F, of the impact resistance zone as to provide a lesser summated pressure P2, set forth above. The rebounding force with which the occupant 10 engages the second inflatable member 24 will be calculated almost instantaneously by cooperative workings of the sensor assembly 46 and the processor 20 so as to regulate and determine the initial inflation pressure Pi of the chambers D, E, and F of the impact resistance zone of inflatable member 24 and based on the initial inflation pressure Pi, the pressure of the remaining internal chambers A, B, and C of the impact absorption zone will also be incrementally determined and adjusted such that absorption and resistance is accomplished in an optimum manner so as to reduce the motion of the occupant's head, or other body part to lesser oscillations.

As shown in FIG. 6 and 7, one strategic location of at least one inflatable member 26 may be in an upper side corner above or adjacent to a door or window opening. When inflated in the manner shown in FIG. 7, the inflatable member 26 will be disposed adjacent to the window, so as to protect the occupant 10 from impacting the window or door.

Similarly, in FIGS. 8 and 9 an inflatable member 28, including the plurality of internal chambers as indicated above, may be mounted in its stored position within a door post 27 and, when inflated, may extend outwardly therefrom so as to protect the occupant 10 from engagement with the door post, window or other portions of the door and thereby reduce or eliminate lateral-flexion which causes the aforementioned injuries. In this manner, a resulting rotation of the occupant 10 as indicated by directional arrow 29 may also be eliminated by engagement with the deployed inflatable member 28.

Figure 10:
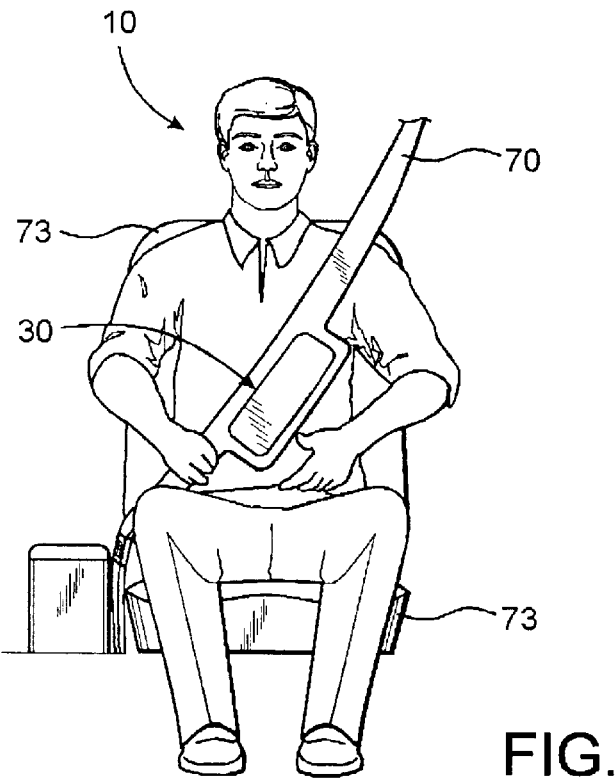
FIG. 10 is a front view of an inflatable member in accordance with the restraint assembly of the present invention mounted on a restraining hardness.
Figure 11:
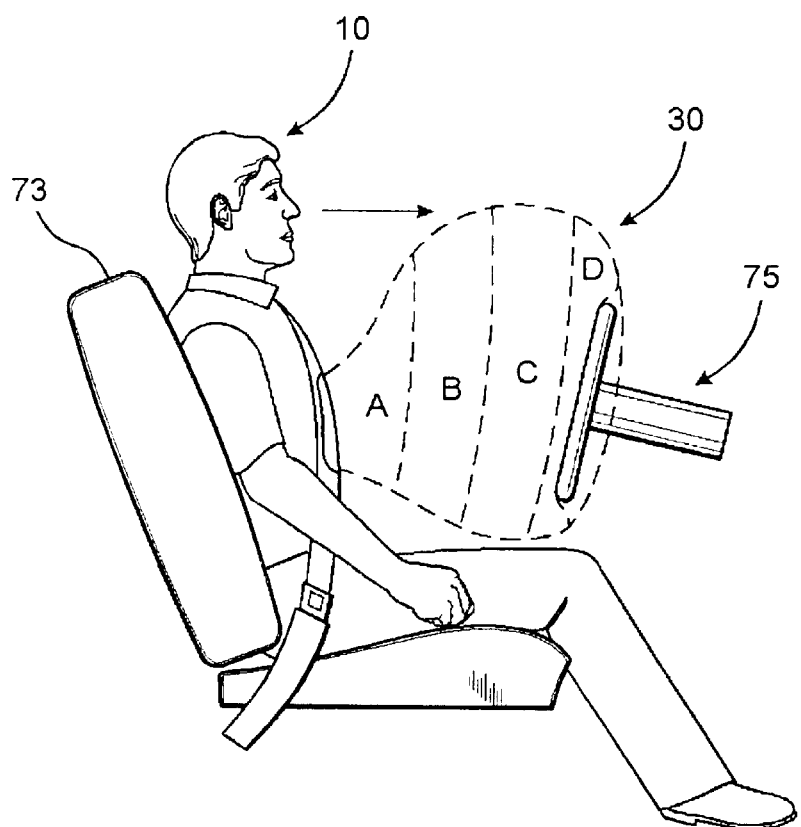
FIG. 11 is a side view of the embodiment of FIG. 10 shown partially in phantom lines indicating a deployment of the inflatable member.
Figure 12:
FIG. 12 is a front view of another embodiment of the present invention wherein at least one inflatable member is mounted on an auxiliary seat, such as a child's seat.

With reference to FIGS. 10 and 11, at least one of the inflatable members 30 may be mounted on a harness 70, which extends across the occupant's body in the conventional manner. The compartment 72 for the inflatable member 30 is mounted such that when deployed, the inflatable member 30 is projected outwardly, away from the occupant 10, when the occupant is in an intended position, such as a seat 73. The inflatable member 30 once deployed may engage the steering wheel or column generally indicated as 75 or other portions of the vehicle, dependent upon the location of the seat and the intended position of the occupant 10.

Figure 13:
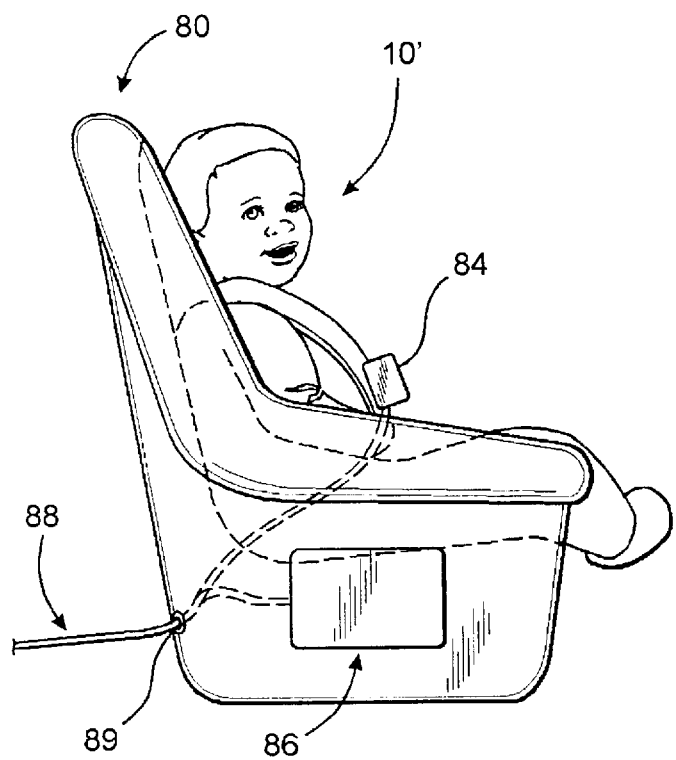
FIG. 13 is a side view of the embodiment of FIG. 12.
Figure 14:
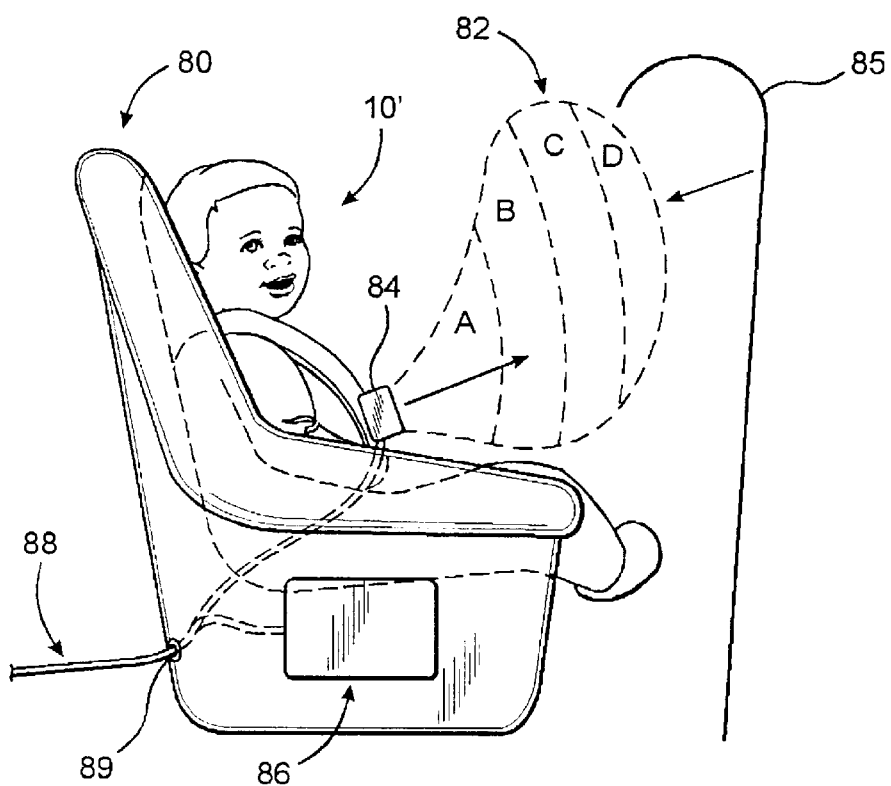
FIG. 14 is a side view of the embodiments of FIGS. 12 and 13 shown in partial phantom lines representing a deployment of the inflatable member.

With regard to FIGS. 12 through 15, the one or more inflatable members 32 and 34 can be mounted on and deployed directly from an auxiliary seat 80, which may be in the form of a child seat or other auxiliary seat. The inflatable member 32 can be stored within a harness or other component or portion of the auxiliary seat 80, as at 84, so that when it is deployed it extends outwardly away from the occupant 10', as shown in FIG. 14, into engagement with a seat back surface 75 or other portion of the vehicle, dependent upon the orientation and location of the auxiliary seat 80. Similarly, a second or additional inflatable member 34 can be deployed outwardly from a side area, as at 86, of the auxiliary seat 80, into engagement with a side portion of the vehicle in order to prevent injury from a side impact of the vehicle.

Figure 15:
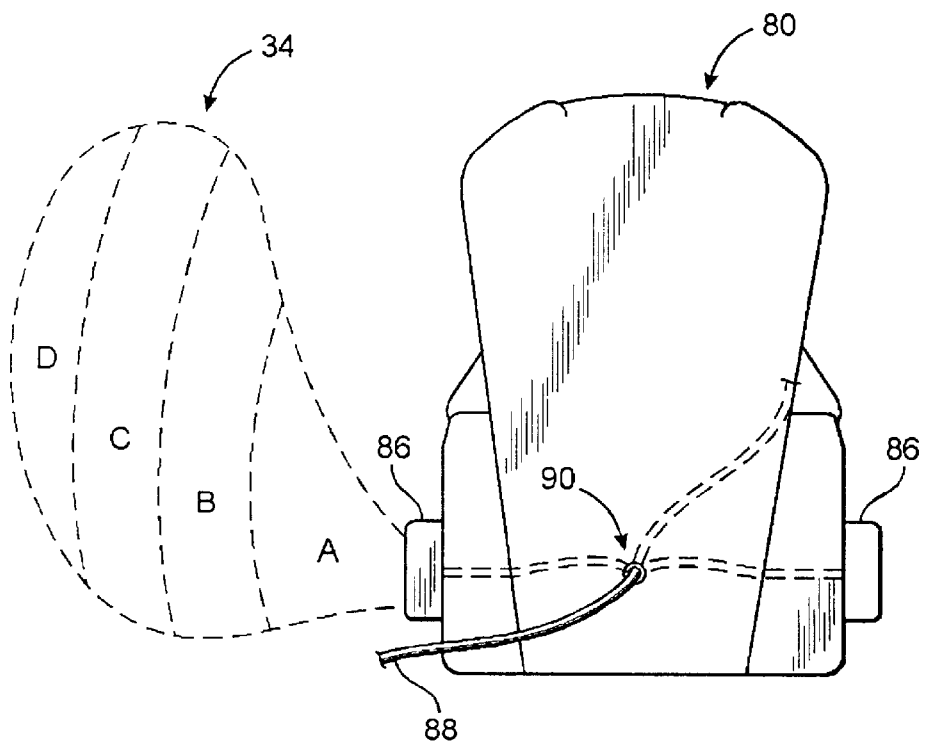
FIG. 15 is a rear view of the embodiment of FIGS. 12 through 14 showing a deployment of another inflatable member being mounted on the side of the auxiliary seat and represented in phantom lines in a deployed position.

FIGS. 13 and 15 also indicate that the inflatable members 32 and 34 may be electrically and/or pneumatically interconnected to the processor 20 and/or to one or more fluid sources of inflatable material, such as air, by a cord or cable assembly 88, running through appropriate mountings and/or apertures 89 and 90, formed on the auxiliary seat 80.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:
1. An inflatable restraint assembly for motor vehicles, said restraint assembly comprising:

a) at least one inflatable member mounted within the vehicle adjacent an intended position of an occupant,
b) a fluid source connected in communication with said inflatable member,
c) a valve assembly mounted in flow regulating relation between said fluid source and said inflatable member,
d) means for sensing pressure within said inflatable member, and
e) a processor operatively connected to said valve assembly and said pressure sensing means, wherein said processor actively and continuously regulates pressure within said inflatable member in response to at least an initial impact force of the occupant with said inflatable member.

2. An assembly as recited in claim 1 wherein said pressure within at least a portion of said inflatable member is incrementally increased above an initial inflation pressure in response to the force of impact of the occupant.

3. An assembly as recited in claim 2 wherein said processor determines a summation of pressure within said inflatable member which does not exceed the impact force of the occupant with said inflatable member.

4. An assembly as recited in claim 2 wherein pressure in at least a portion of said inflatable member is reduced to the initial inflation pressure subsequent to the initial impact of the occupant with said inflatable member.

5. An assembly as recited in claim 1 wherein said processor is structured to actively regulate pressure within said inflatable member in response to each of a plurality of a successive impact forces of the occupant with said inflatable member.

6. An assembly as recited in claim 5 wherein pressure within at least a portion of said inflatable member is reduced to the initial inflation pressure subsequent to each of the plurality of successive impact forces.

7. An assembly as recited in claim 1 wherein said pressure sensing means comprises a sensor assembly operatively connected to said inflatable member and disposed to sense pressure within said inflatable member and relay the sensed pressure to said processor.

8. An assembly as recited in claim 7 wherein said sensor assembly and said processor are cooperatively disposed and structured to summate pressure within said inflatable member and compare and regulate the pressure therein in response to the impact force of the occupant with said inflatable member.

9. An assembly as recited in claim 8 wherein said processor determines a summation of pressure within said inflatable member which does not exceed the impact force of the occupant with said inflatable member.

10. An assembly as recited in claim 1 further comprising an impact absorption zone and an impact resistance zone formed on the interior of said inflatable member in fluid segregated relation to one another, said impact absorption zone and said impact resistance zone having at least initially different pressures upon inflation.

11. An assembly as recited in claim 10 wherein said pressure sensing means comprises a sensor assembly operatively connected to said inflatable member and disposed to sense pressure within both said impact absorption zone and said impact resistance zone and relay the sensed pressures to said processor.

12. An assembly as recited in claim 11 wherein said sensor assembly and said processor are cooperatively disposed and structured to summate pressure within said impact absorption zone and said impact resistance zone and compare and regulate the sensed pressures in response to the impact force of the occupant with said inflatable member.

13. An assembly as recited in claim 12 wherein said impact resistance zone has an initially greater pressure than said impact absorption zone upon inflation.

14. An assembly as recited in claim 13 wherein said impact absorption zone is structured to have a continuously reducing internal pressure in response to the initial impact force of the occupant with said inflatable member.

15. An assembly as recited in claim 14 wherein said valve assembly and said processor are interconnected and cooperatively structured to provide an incremental pressure increase in said impact resistance zone in response to the initial impact force of the occupant with said inflatable member.

16. An assembly as recited in claim 15 wherein a summation of internal pressures within said impact resistance zone and said impact absorption zone is equal to or less than the impact force of the occupant with said inflatable member.

17. An assembly as recited in claim 10 wherein said inflatable member comprises a plurality of chambers disposed internally of said inflatable member and being at least partially segregated from one another, said valve assembly operatively disposed in flow regulating relation between said fluid source and said plurality of chambers.

18. An assembly as recited in claim 10 wherein said impact absorption zone comprises a first plurality of chambers at least partially separated by a partition.

19. An assembly as recited in claim 18 wherein said impact absorption zone comprises a continuously reduced pressure in response to receiving the initial impact force of the occupant with said inflatable member.

20. An assembly as recited in claim 19 wherein said partition comprises an apertured construction disposed to allow fluid flow from a leading one to a trailing one of said first plurality of chambers whereby the initial impact force is at least partially absorbed.

21. An assembly as recited in claim 19 wherein said processor and said valve assembly are cooperatively structured to facilitate at least partial deflation of said first plurality of chambers substantially at the time of the initial impact force of the occupant with said inflatable member.

22. An assembly as recited in claim 19 wherein said impact resistance zone comprises at least a second plurality of chambers each comprising an initial pressure upon inflation, said pressure sensing means and said processor cooperatively structured to incrementally increase said initial pressure in response to the initial impact force of the occupant with said inflatable member.

23. An assembly as recited in claim 22 wherein said second plurality of chambers comprise a reduced pressure substantially equal to the initial inflation pressure immediately subsequent to exposure of the inflatable member to the initial impact force.

24. An inflatable restraint assembly for a motor vehicle, said assembly comprising:
   a) at least one inflatable member mounted within the vehicle adjacent an intended position of an occupant,
   b) said inflatable member comprising a first plurality of internally disposed chambers def ining an impact absorption zone and a second plurality of internally disposed chambers defining an impact resistance zone,
   c) a fluid source connected in fluid communication with both said first and second plurality of chambers,
   d) a valve assembly mounted in flow regulating relation between said fluid source and said first and second plurality of chambers,
   e) a sensor assembly operatively connected to said inflatable member and structured to determine pressure within said first and second plurality of chambers,
   f) a processor operatively connected to at least said valve assembly and responsive to said sensor assembly to continuously regulate flow of fluid to and from said first and second plurality of chambers, and
   g) said processor and said valve assembly cooperatively structured to establish a predetermined gradient pressure differential between said impact absorption and said impact resistance zones based on an impact force of an occupant with said inflatable member.

25. An assembly as recited in claim 24 wherein said processor and said valve assembly are cooperatively structured to facilitate at least a partial deflation of said first plurality of chambers substantially at the time of and in response to an initial impact force of an occupant with said inflatable member.

26. An assembly as recited in claim 25 wherein said second plurality of chambers each comprise an initial pressure upon inflation, said sensor assembly and said processor being cooperatively structured to incrementally increase said initial pressure in response to the initial impact force of the occupant with said inflatable member.

27. An assembly as recited in claim 26 wherein said second plurality of chambers comprises a reduced pressure substantially equal to the initial inflation pressure immediately subsequent to exposure of the inflatable member to the initial impact force.

28. An assembly as recited in claim 25 wherein adjacent ones of said first plurality of chambers are separated from one another by a partition, said partition comprising an apertured construction disposed to allow fluid flow from a leading one to a trailing one of said first plurality of chambers, whereby the initial impact force is at least partially absorbed.

29. An inflatable restraint assembly for a motor vehicle, said assembly comprising:
   a) at least a first inflatable member and a second inflatable member mounted in the vehicle adjacent to an intended position of an occupant,
   b) said first and second inflatable members disposed in substantially opposed relation to one another and cooperatively positioned to restrain substantially oppositely directed motions of the occupant,
   c) each of said first and second inflatable members comprising a first plurality of internally disposed chambers defining an impact absorption zone and a second plurality of internally disposed chambers defining an impact resistance zone,
   d) a fluid source connected in fluid communication with both said first and second plurality of chambers of each of said first and second inflatable members,
   e) a valve assembly mounted in flow regulating relation between said fluid source and said first and second plurality of chambers of each of said first and second inflatable members,
   f) a sensor assembly operatively connected to each of said first and second inflatable members and structured to determine pressure within said first and second plurality of chambers,
   g) a processor operatively connected to at least said valve assembly and responsive to said sensor assembly to continuously regulate flow of fluid into and out of said first and second plurality of chambers of each of said first and second inflatable members, and
   h) said processor and said valve assembly cooperatively structured to establish a predetermined gradient pressure differential between said impact absorption and said impact resistance zones of each of said first and second inflatable members in response to the impact force of an occupant with said first and second inflatable members.

30. An assembly as recited in claim 29 wherein said sensor assembly is structured to relay sensed pressure of said first inflatable member responsive to the impact force of an occupant with said first inflatable member to said processor for regulation of the pressure within said second inflatable member.

* * * * *